(12) United States Patent
Mielenz et al.

(10) Patent No.: US 9,990,849 B2
(45) Date of Patent: Jun. 5, 2018

(54) METHOD AND DEVICE FOR ASCERTAINING A PARKING POSITION FOR A VEHICLE

(71) Applicant: Robert Bosch GmbH, Stuttgart (DE)

(72) Inventors: Holger Mielenz, Ostfildern (DE); Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 61 days.

(21) Appl. No.: 15/040,679

(22) Filed: Feb. 10, 2016

(65) Prior Publication Data

US 2016/0240082 A1    Aug. 18, 2016

(30) Foreign Application Priority Data

Feb. 12, 2015   (DE) .................. 10 2015 202 480

(51) Int. Cl.
   *G08G 1/14* (2006.01)
   *B62D 15/02* (2006.01)

(52) U.S. Cl.
   CPC .......... *G08G 1/141* (2013.01); *B62D 15/027* (2013.01); *B62D 15/0285* (2013.01); *G08G 1/143* (2013.01)

(58) Field of Classification Search
   None
   See application file for complete search history.

(56) References Cited

U.S. PATENT DOCUMENTS

| 5,524,863 A | 6/1996 | Davis |
| 2012/0112929 A1 | 5/2012 | Gupta et al. |
| 2014/0180523 A1* | 6/2014 | Reichel ............. B62D 15/0285 701/23 |
| 2015/0307089 A1* | 10/2015 | Vorobieva ............ B62D 15/027 701/25 |
| 2017/0305467 A1* | 10/2017 | Nordbruch ......... B62D 15/0285 |

FOREIGN PATENT DOCUMENTS

| DE | 19747548 A1 | 4/1998 |
| DE | 10 2004 062 021 | 7/2006 |
| DE | 102009029720 A1 | 12/2010 |
| DE | 10 2012 222 562 | 6/2014 |
| DE | 10 2012223 057 | 6/2014 |
| DE | 102014221764 A1 | 4/2016 |
| DE | 102014224075 A1 | 6/2016 |
| WO | WO 2011 138 035 | 11/2011 |
| WO | WO 2015114592 A1 * | 8/2015 ............ B60W 30/06 |

OTHER PUBLICATIONS

English WO2015114592.*

* cited by examiner

Primary Examiner — Rami Khatib
Assistant Examiner — Nicholas K Wiltey
(74) Attorney, Agent, or Firm — Norton Rose Fulbright US LLP; Gerard Messina

(57) ABSTRACT

A method for ascertaining a parking position for a vehicle, including the following: ascertaining a vehicle geometry and a maneuverability parameter of the vehicle, and selecting a parking position for the vehicle from a plurality of parking positions of a parking lot as a function of the vehicle geometry and the maneuverability parameter. Also described is a corresponding device, a parking system, and a computer program.

10 Claims, 2 Drawing Sheets

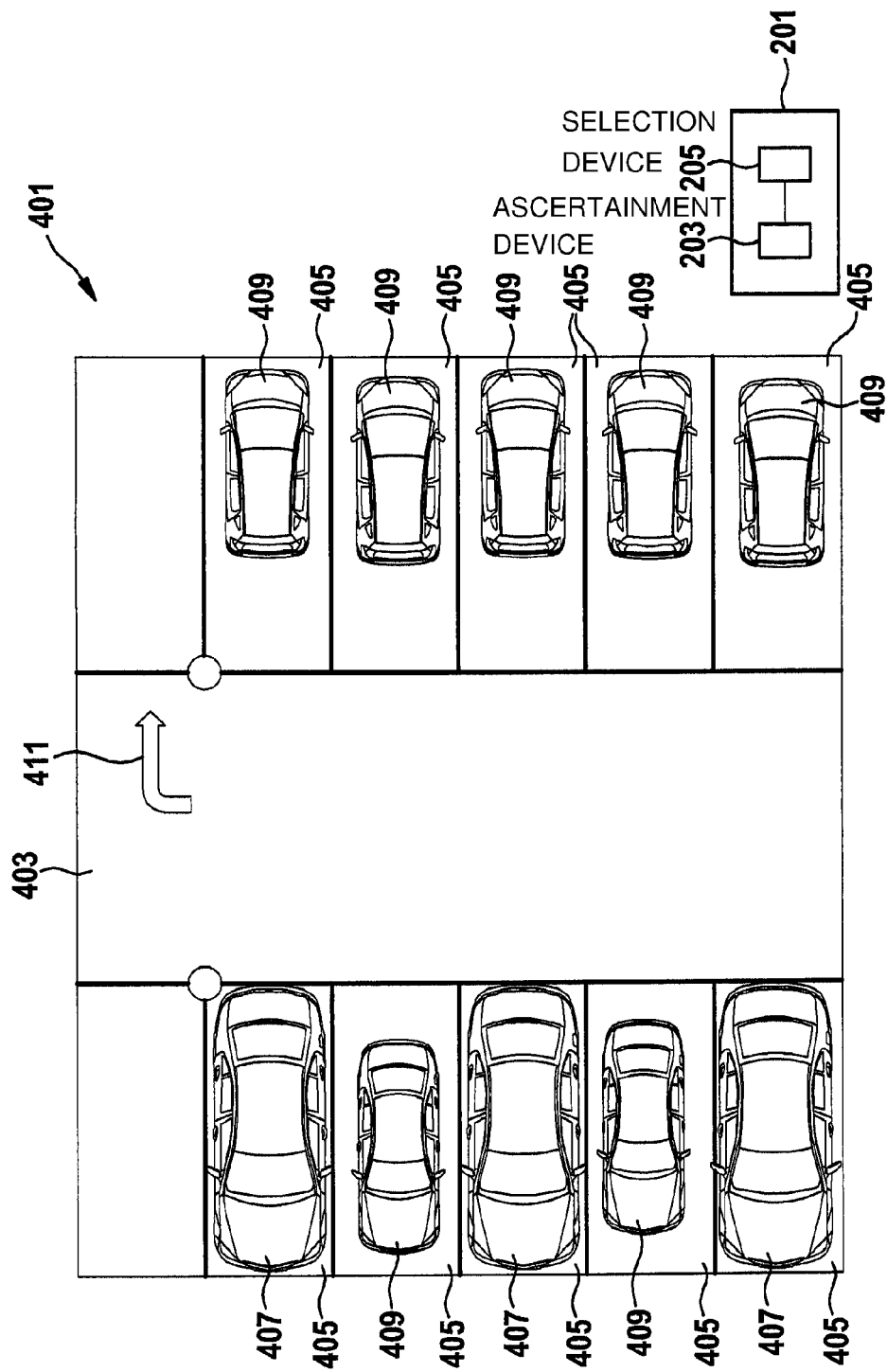

METHOD AND DEVICE FOR ASCERTAINING A PARKING POSITION FOR A VEHICLE

RELATED APPLICATION INFORMATION

The present application claims priority to and the benefit of German patent application no. 10 2015 202 480.6, which was filed in Germany on Feb. 12, 2015, the disclosure of which is incorporated herein by reference.

FIELD OF THE INVENTION

The present invention relates to a method and to a device for ascertaining a parking position for a vehicle. The present invention further relates to a parking system for vehicles and to a computer program.

BACKGROUND INFORMATION

The unexamined patent application DE 10 2012 222 562 A1 discusses a system for managed parking areas for transferring a vehicle from a starting position into a target position.

In the case of fully automated (autonomous) so-called valet parking, a driver parks the vehicle in a drop-off spot, for example in front of a parking garage, and from there the vehicle drives itself into a parking position/parking space and back to the drop-off spot.

SUMMARY OF THE INVENTION

It is an object of the present invention to provide an efficient concept for ascertaining a parking position for a vehicle which makes it possible to reduce a likelihood of collision with already parked vehicles and/or with a stationary infrastructure (for example, walls and/or columns) during an operation of the vehicle pulling into and/or out of a parking space.

This object is achieved with the aid of the respective subject matter of the descriptions herein. Advantageous embodiments of the present invention are the subject matter of the respective further descriptions herein.

According to one aspect, a method for ascertaining a parking position for a vehicle is provided, including the following steps:

ascertaining a vehicle geometry and a maneuverability parameter of the vehicle, selecting a parking position for the vehicle from a plurality of parking positions in a parking lot as a function of the vehicle geometry and the maneuverability parameter.

According to still another aspect, a device for ascertaining a parking position for a vehicle is provided, including:

an ascertainment device for ascertaining a vehicle geometry and a maneuverability parameter of the vehicle, and a selection device for selecting a parking position for the vehicle from a plurality of parking positions in a parking lot as a function of the vehicle geometry and the maneuverability parameter.

According to a further aspect, a parking system for vehicles is provided, the parking system including a parking lot having multiple parking positions, the parking system furthermore including the device for ascertaining a parking position for a vehicle.

According to another aspect, a computer program is provided, which includes program code for carrying out the method for ascertaining a parking position for a vehicle if the computer program is executed on a computer.

The present invention thus in particular and among other things includes the idea of selecting the parking position for the vehicle from a plurality of parking positions of a parking lot as a function of the vehicle geometry and the maneuverability parameter. This in particular yields the technical advantage that an individually adapted parking position may be found for the vehicle. This means that it is possible, via the vehicle geometry and the maneuverability parameter, to influence that parking position in which the vehicle is to be parked. As a result, not simply any arbitrary free parking position is selected for the vehicle as that parking position in which the vehicle is to be parked. Rather, a parking position which is adapted to the vehicle geometry and to the maneuverability parameter is selected for the vehicle. Due to the correspondingly efficiently adapted parking position for the vehicle, a likelihood of collision with already parked vehicles may advantageously be reduced during an operation of the vehicle pulling into and/or out of a parking space.

A vehicle geometry in particular includes a length and/or a height and/or a width of the vehicle. This means that the ascertainment of the vehicle geometry includes the following: ascertaining a length and/or ascertaining a height and/or ascertaining a width of the vehicle.

A maneuverability parameter in particular describes how maneuverable a vehicle is. A maneuverability parameter, for example, includes a turning circle of the vehicle and/or a maximum steering angle. In particular, it is provided that multiple maneuverability parameters are ascertained.

A parking lot within the meaning of the present invention may also refer to a parking area and serves as a parking area for vehicles. The parking lot thus forms in particular a contiguous surface area which includes multiple parking spots (in the case of a parking lot on private property) or parking positions (in the case of a parking lot on public property). According to one specific embodiment, the parking lot may also include a parking garage. The parking lot in particular includes a garage.

In another specific embodiment, it is provided that parking position is selected for the vehicle for which a maneuvering area for the vehicle when pulling into and/or out of a parking position is greater than or greater than or equal to a predetermined maneuvering area threshold value. In another specific embodiment, it is provided that parking position is selected for the vehicle for which a maneuvering area for the vehicle when pulling into and/or out of a parking position is maximized.

This in particular yields the technical advantage that sufficient maneuvering area is available for the vehicle when pulling into and/or out of a parking space. The reason for this is that not every vehicle is equally maneuverable. There are vehicles, for example, which require a larger turning circle when pulling into and/or out of a parking space than other vehicles, for example. It may thus advantageously be ensured that an individual maneuvering area is made available specifically for the vehicle. This further reduces a likelihood of collision with already parked vehicles when the vehicle is pulling into or out of a parking space.

In another specific embodiment, it is provided that parking position is selected for the vehicle for which a number of maneuvers required by the vehicle for pulling into and/or out of the parking position is less than or less than or equal to a predetermined maneuver threshold. In another specific embodiment, it is provided that parking position is selected for the vehicle for which a number of maneuvers required by the vehicle for pulling into and/or out of the parking position is minimized.

This in particular yields the technical advantage that an operation of pulling into and/or out of a parking space may be carried out quickly and efficiently, provided it is ensured that only a number of maneuvers is carried out which is less than or equal to a predetermined maneuver threshold. A maneuver within the meaning of the present invention refers to a forward maneuver or a backward maneuver, which are carried out within the scope of pulling into and/or out of a parking space. For example, a maneuver may include driving forward or backing up. It may be necessary, for example, that a vehicle must drive forward and back up multiple times to pull into or out of a parking space, so that one instance of driving forward and one instance of backing up each correspond to a maneuver. If the vehicle, for example, has to drive forward once and then back up once to pull into or out of the parking space, this operation of pulling in and/or out requires two maneuvers.

According to another specific embodiment, it is provided that parking position is selected for the vehicle which is situated directly adjoining a parking position which was already assigned to a further vehicle which, relative to the vehicle, is larger or smaller and/or less maneuverable or more maneuverable.

This in particular yields the technical advantage that vehicles of differing sizes park directly next to each other. It is thus advantageously ensured that a larger vehicle is always parked next to a smaller vehicle. Since the smaller vehicle always takes up less space than the larger vehicle, the larger vehicle thus has a larger maneuvering area available in its immediate surroundings.

In another specific embodiment, it is provided that the vehicle is classified as a large or as a small vehicle as a function of the vehicle geometry, the maneuverability parameter and one or multiple variables and/or one or multiple maneuverability threshold values, whereupon that parking position is selected for the vehicle which is situated directly adjoining a further parking position which was already assigned to a further vehicle, the further vehicle having been classified as a small vehicle as a function of its vehicle geometry, its maneuverability parameter and the one or the multiple threshold value(s) during a classification of the vehicle as a large vehicle, or having been classified as a large vehicle during a classification of the vehicle as a small vehicle.

This in particular yields the technical advantage that it is possible to carry out a simple and efficiently structured size classification, the parking position then being selected based on this size classification. A vehicle is thus classified into one of two classes: "large" class and "small" class. It is advantageously ensured also in this specific embodiment that a large vehicle is always parked next to a small vehicle according to the classification. The large vehicle thus has a larger maneuvering area available compared to the case if it were parked next to another large vehicle. Due to its greater maneuverability, it is generally easier for the small vehicle to pull into or out of a parking space when a large vehicle is parked next to it than it is for a large and less maneuverable vehicle.

According to one specific embodiment, it is provided that the ascertainment includes that the vehicle is detected by sensors. This in particular yields the technical advantage that it is possible to efficiently ascertain the configuration of the vehicle geometry. In particular, the detection by sensors includes measuring the vehicle by sensors. In particular, it is provided that a search for the vehicle geometry and/or for the maneuverability parameter is carried out in a database based on the detection by sensors. Such a database in particular includes previously established vehicle types having assigned vehicle geometries and maneuverability parameters. So if, based on the detection by sensors, a certain vehicle type or vehicle model is recognized, the corresponding parameters and the corresponding vehicle geometry may be easily and efficiently read out from the database.

The detection by sensors is carried out using a sensor detection unit, for example. The sensor detection unit includes one or multiple of the following sensors, for example: ultrasonic sensor, laser sensor, LIDAR sensor, video sensor, and radar sensor.

According to one specific embodiment, it is provided that the ascertainment includes that the vehicle geometry and/or the maneuverability parameter is/are received via a communication network. This in particular yields the technical advantage that the vehicle geometry and the maneuverability parameter may also be ascertained without detection by sensors. In particular, the vehicle geometry and the maneuverability parameter are received with the aid of the device. For example, the device includes a communication interface for this purpose, which is configured to receive the vehicle geometry and/or the maneuverability parameter via the communication network. For example, the vehicle itself transmits the vehicle geometry and/or the maneuverability parameter via the communication network to the device.

According to one specific embodiment, it is provided that the communication network includes a WLAN network and/or a mobile communication network.

According to one specific embodiment, it is provided that the communication via the communication network is and/or is being encrypted.

According to one specific embodiment, it is provided that the vehicle is an autonomous and/or a remotely controllable vehicle, so that the vehicle is able to drive to the selected parking position partly autonomously and/or partly remotely controlled.

This means that the vehicle is able to carry out so-called automatic valet parking. "Automatic valet parking" stands for an "automatic parking operation" here. Autonomously within the meaning of the present invention means in particular that the vehicle navigates or drives independently in the parking lot, i.e., without an intervention of a driver. The vehicle thus drives independently in the parking lot, without a driver having to steer the vehicle to do so. Such autonomous driving includes in particular an autonomous regulation or control of a transverse guidance and/or a longitudinal guidance of the vehicle. Autonomously within the meaning of the present invention in particular means that the vehicle is able to automatically, i.e., autonomously, pull into and/or out of a parking space, i.e., autonomously pull into the parking position or autonomously pull out of the parking position. Such an autonomously driving vehicle is referred to as an AVP vehicle, for example. Vehicles which do not have this AVP functionality are referred to as normal vehicles, for example.

This means in particular that a parking position is ascertained for such AVP vehicles and/or for such remotely controllable vehicles according to the statements made above and below. Such a parking position may then be transmitted to the vehicle via the communication network. The vehicle is then driven autonomously to the parking position based on the received parking position. In particular, the vehicle is driven to the parking position remotely controlled. In particular, it is provided that a setpoint trajectory for the vehicle to the parking position is ascertained, which is provided to the vehicle via the communication network, for example. In this way, the vehicle may thus autonomously drive to the parking position, for example based on the setpoint trajectory.

According to one specific embodiment, it is provided that the device for ascertaining a parking position for a vehicle is configured to implement or carry out the method for ascertaining a parking position for a vehicle.

For example, the ascertainment device includes a communication interface which is configured to receive a vehicle geometry and a maneuverability parameter of the vehicle via a communication network. This means that the ascertainment of the vehicle geometry and of the maneuverability parameter includes a reception of the vehicle geometry and of the maneuverability parameter via the communication network.

According to one specific embodiment, it is provided that the selection of the parking position is carried out as a function of a size (length and/or width and/or height) of the parking position.

Specific embodiments with respect to the device are derived analogously from specific embodiments with respect to the method, and vice versa. This means that functionalities and technical features of the device are derived analogously from corresponding specific embodiments, functionalities and technical features with respect to the method, and vice versa.

The present invention is described in greater detail hereafter based on the exemplary embodiments.

BRIEF DESCRIPTION OF THE DRAWINGS

FIG. 4 shows a further parking system for vehicles.

DETAILED DESCRIPTION

Figure 1:
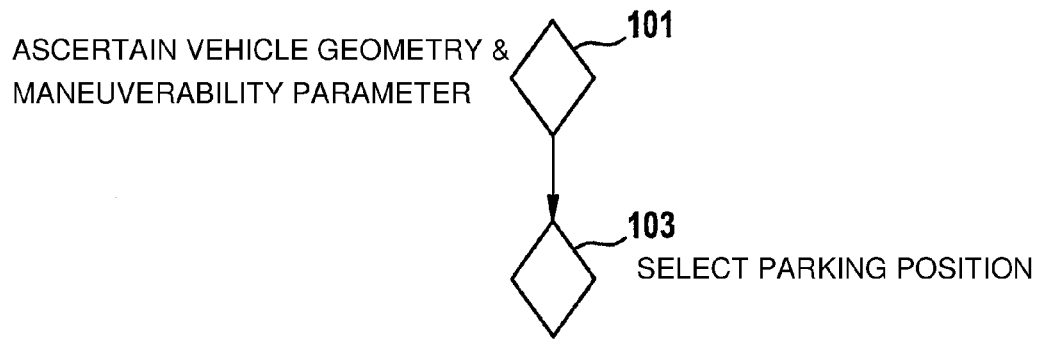
FIG. 1 shows a flow chart of a method for ascertaining a parking position for a vehicle.

FIG. 1 shows a flow chart of a method for ascertaining a parking position for a vehicle.

According to a step 101, a vehicle geometry and a maneuverability parameter of the vehicle are ascertained. In a step 103, a parking position is selected for the vehicle from a plurality of parking positions of a parking lot. This takes place as a function of the vehicle geometry and the maneuverability parameter.

Figure 2:
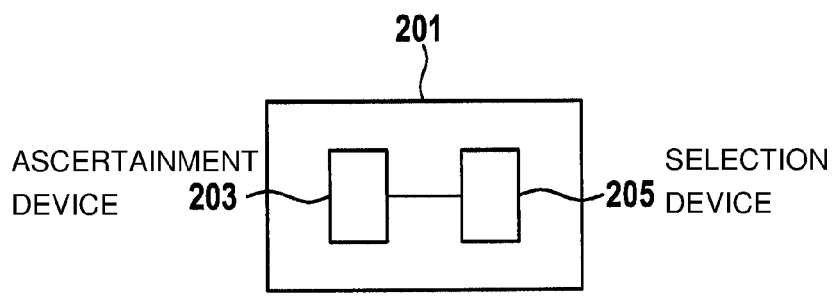
FIG. 2 shows a device for ascertaining a parking position for a vehicle.

FIG. 2 shows a device 201 for ascertaining a parking position for a vehicle.

Device 201 includes an ascertainment device 203 for ascertaining a vehicle geometry and a maneuverability parameter of the vehicle. Device 201 furthermore includes a selection device 205 for selecting a parking position for the vehicle from a plurality of parking positions of a parking lot as a function of the vehicle geometry and the maneuverability parameter.

Figure 3:
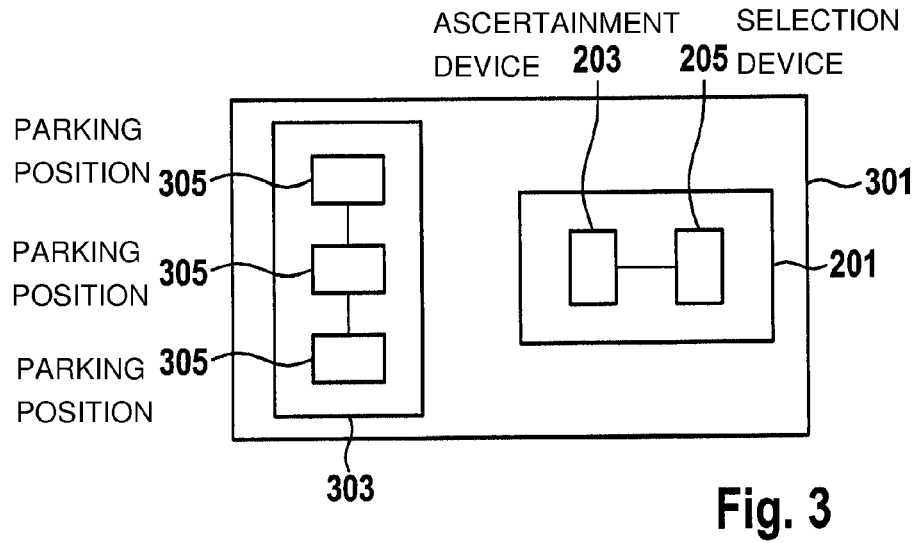
FIG. 3 shows a parking system for vehicles.

FIG. 3 shows a parking system 301 for vehicles.

Parking system 301 includes a parking lot 303. Parking lot 303 includes multiple parking positions 305. Parking system 301 furthermore includes device 201 from FIG. 2.

FIG. 4 shows a further parking system 401 for vehicles.

Parking system 401 includes a parking lot 403 having multiple parking positions 405. Parking system 401 furthermore includes device 201 from FIG. 2. Vehicles 407, 409 are parked in parking positions 405. Reference numeral 407 refers to large vehicles here. Reference numeral 409 refers to small vehicles. This classification into large vehicle or small vehicle is carried out as a function of the respective vehicle geometry and the respective maneuverability parameter of vehicles 407, 409 and a predetermined threshold value, in particular as a function of multiple predetermined threshold values. Such threshold values include a maneuverability threshold value and/or a size threshold value, for example. This means in particular that the vehicle is classified as a function of a vehicle size and a maneuverability of the vehicle as a large or as a small vehicle corresponding to the threshold values.

As FIG. 4 clearly shows, a large vehicle 407 parks next to a small vehicle 409 in each case to the left (based on the drawing plane) parking positions 405. Only small vehicles 409 park to the right (based on the drawing plane) parking positions 405.

By having a small vehicle 409 park next to a large vehicle 407, sufficient maneuvering space remains for large vehicle 407 for pulling into and/or out of a parking space.

In particular, according to one specific embodiment it is provided that parking positions 405 for large vehicles 407 are selected in such a way that a maneuvering area for backing out of a parking space is maximized at the rear and side areas of large vehicles 407 to the effect that small (and generally also more maneuverable) vehicles 409 are and/or were parked in these areas.

Vehicles 407, 409 are autonomous and/or remotely controllable vehicles, for example. This means, for example, that vehicles 407, 409 may be AVP vehicles.

Reference numeral 411 refers to a directional arrow specifying a driving direction within parking lot 403.

The present invention thus in particular and among other things includes the idea of providing an efficient concept with the aid of which an automated valet parking system may be efficiently operated, reducing a likelihood of collision with already parked vehicles during an automated operation of pulling into and/or out of a parking space.

The concept according to the present invention is in particular based on ascertaining the geometry and maneuverability (maneuverability parameter) for the vehicles, the parking position of the vehicle or vehicles being selected in such a way that large and less maneuverable vehicles are parked separately in such a way that, for example, the maneuvering areas are maximized for these vehicles. For parallel parking spaces, as they occur in parking facilities or parking lots, for example, this may be achieved in that a sorting is carried out in such a way that smaller vehicles are parked behind and/or next to the large and less maneuverable vehicles, whereby backing out of a parking space may be carried out with fewer maneuvers and more safely for the unwieldy vehicles (large vehicles).

This means in particular that a parking position for a vehicle driving in an automated manner or autonomously and/or for a remotely controllable vehicle is established in such a way that a maximum potential maneuvering area is achieved for less maneuverable and unwieldier vehicles, for example, as a function of the vehicle geometry and the vehicle maneuverability (minimal curve radius, maximal steering angle). This is achieved in particular in that vehicles having smaller dimensions are parked and/or placed in the rear areas and, if necessary, side areas.

According to one specific embodiment, the ascertainment device ascertains the vehicle geometry and the maneuverability parameter of the vehicle. This takes place in particular when the vehicle enters an entrance area of the parking lot. For example, the vehicle geometry and the maneuverability parameter may be ascertained with the aid of an image processing unit and an automated read-out from a database according to a prior vehicle type classification. For example, it is provided that the vehicle transmits the vehicle geometry and/or the maneuverability parameter via the communication network to the device, which may be included in a parking lot server, for example, in particular a parking garage server.

For example, the vehicle is now assigned a parking position in such a way that, for example as a function of the widths of the drivable surface areas in the parking lot, the vehicle parks next to a small vehicle when it is a large vehicle, or parks next to a large vehicle when it is a small vehicle. This means that, according to one specific embodiment, it is provided that vehicles are parked in such a way that small and large vehicles alternately park next to each other. According to one specific embodiment, it is provided that a small vehicle is always parked opposite a large vehicle. This means that two opposing parking positions are provided, for example, between which an access lane of the parking lot runs. If a large vehicle is already parked in one of the opposing parking spaces, a small vehicle (in general, a smaller and/or more maneuverable vehicle than the vehicle to be parked) is parked in the other of the opposing parking spaces, and vice versa. Via the vehicle geometry and a respective maneuverability of the vehicles a distinction is made here in particular between a large and a small vehicle according to a predetermined threshold value.

Thereafter, in particular a trajectory to the target position, i.e., in particular to the parking position, is ascertained. Guiding the vehicle to the target position is then carried out autonomously by the vehicle itself, for example. In particular, the vehicle is guided to the parking position remotely controlled.

As an alternative or in addition, it is provided according to one specific embodiment that, for the ascertainment of the parking position, it is also ascertained how many maneuvers are to be expected for an operation of pulling into and/or out of a parking space, the vehicles then being parked in such a way that this number of maneuvers is minimized. This means, for example, that the assignment of the vehicles does not necessarily have to be carried out in such a structured manner according to the classification 'large' and 'small.' In particular, it is instead provided that a free search is carried out to the effect that free parking spaces are selected based on a greedy strategy or based on a greedy algorithm and that a number of the required maneuvers is ascertained and minimized via the available free space and the geometry and maneuverability of the vehicle to be parked.

Advantages of the concept according to the present invention are in particular a reduction of a likelihood of collision during the operation of pulling into and/or out of a parking space in that large and/or less mobile vehicles are positioned in such a way that they, for example, are given the largest possible maneuvering space by filling the parking spaces in the rear area and/or flank area with smaller vehicles. As a result of the concept according to the present invention, in particular requirements with regard to a location accuracy and a vehicle movement regulation and/or trajectory planning may be reduced, which may result in technically less complex and more favorable system approaches.

What is claimed is:

1. A method for ascertaining a parking position for a vehicle, the method comprising:
   ascertaining, via a processor system, a vehicle geometry and a maneuverability parameter of the vehicle; and
   selecting, via the processor system, a parking position for the vehicle from a plurality of parking positions of a parking lot as a function of the vehicle geometry and the maneuverability parameter;
   wherein the ascertaining includes at least one of: (i) detecting, via sensors, the vehicle geometry and the maneuverability parameter of the vehicle, and (ii) receiving the vehicle geometry and/or the maneuverability parameter via a communication network, and
   wherein the vehicle is classified as a large vehicle or as a small vehicle as a function of at least one of: (i) the vehicle geometry, (ii) the maneuverability parameter and at least one variable and/or at least one maneuverability threshold value,
   wherein the parking position is selected for the vehicle, which is situated directly adjoining a further parking position, wherein the parking position was already assigned to a further vehicle,
   wherein one of the following is satisfied:
      the further vehicle has been classified as a small vehicle as a function of at least one of: (i) a vehicle geometry of the further vehicle, (ii) a maneuverability parameter of the further vehicle, and at least one variable and/or at least one maneuverability threshold value, during a classification of the vehicle as a large vehicle, or
      the further vehicle having been classified as a large vehicle during a classification of the vehicle as a small vehicle.

2. The method of claim 1, wherein that parking position is selected for the vehicle for which a maneuvering area for the vehicle when pulling into and/or out of the parking position is greater than or greater than or equal to a predetermined maneuvering area threshold value.

3. The method of claim 1, wherein that parking position is selected for the vehicle for which a number of maneuvers required by the vehicle for pulling into and/or out of the parking position is less than or less than or equal to a predetermined maneuver number threshold value.

4. The method of claim 1, wherein that parking position is selected for the vehicle which is situated directly adjoining a parking position which was already assigned to a further vehicle which, relative to the vehicle, is larger or smaller and/or less mobile or more mobile.

5. The method of claim 1, wherein the ascertaining includes detecting, via sensors, the vehicle geometry and the maneuverability parameter of the vehicle.

6. The method of claim 1, wherein the ascertaining includes receiving the vehicle geometry and/or the maneuverability parameter via the communication network.

7. The method of claim 1, wherein the vehicle includes an autonomous and/or a remotely controllable vehicle, so that the vehicle is drivable to the selected parking position partly autonomously and/or partly remotely controlled.

8. A device for ascertaining a parking position for a vehicle, comprising:
   a processor system configured to perform the following:
      ascertaining a vehicle geometry and a maneuverability parameter of the vehicle; and
      selecting a parking position for the vehicle from a plurality of parking positions in a parking lot as a function of the vehicle geometry and the maneuverability parameter;
      wherein the ascertaining includes at least one of: (i) detecting, via sensors, the vehicle geometry and the maneuverability parameter of the vehicle, and (ii)

receiving the vehicle geometry and/or the maneuverability parameter via a communication network, and wherein the vehicle is classified as a large vehicle or as a small vehicle as a function of at least one of: (i) the vehicle geometry, (ii) the maneuverability parameter and at least one variable and/or at least one maneuverability threshold value, wherein the parking position is selected for the vehicle, which is situated directly adjoining a further parking position, wherein the parking position was already assigned to a further vehicle, wherein one of the following is satisfied:
the further vehicle has been classified as a small vehicle as a function of at least one of: (i) a vehicle geometry of the further vehicle, (ii) a maneuverability parameter of the further vehicle, and at least one variable and/or at least one maneuverability threshold value, during a classification of the vehicle as a large vehicle, or
the further vehicle having been classified as a large vehicle during a classification of the vehicle as a small vehicle.

9. A parking system for a vehicle, comprising:
a parking lot having multiple parking positions; and
a device for ascertaining a parking position for a vehicle, including a processor system configured to perform the following:
ascertaining, via the processor system, a vehicle geometry and a maneuverability parameter of the vehicle; and
selecting, via the processor system, a parking position for the vehicle from a plurality of parking positions in a parking lot as a function of the vehicle geometry and the maneuverability parameter;
wherein the ascertaining includes at least one of: (i) detecting, via sensors, the vehicle geometry and the maneuverability parameter of the vehicle, and (ii) receiving the vehicle geometry and/or the maneuverability parameter via a communication network, and
wherein the vehicle is classified as a large vehicle or as a small vehicle as a function of at least one of: (i) the vehicle geometry, (ii) the maneuverability parameter and at least one variable and/or at least one maneuverability threshold value,
wherein the parking position is selected for the vehicle, which is situated directly adjoining a further parking position, wherein the parking position was already assigned to a further vehicle,
wherein one of the following is satisfied:
the further vehicle has been classified as a small vehicle as a function of at least one of: (i) a vehicle geometry of the further vehicle, (ii) a maneuverability parameter of the further vehicle, and at least one variable and/or at least one maneuverability threshold value, during a classification of the vehicle as a large vehicle, or
the further vehicle having been classified as a large vehicle during a classification of the vehicle as a small vehicle.

10. A non-transitory computer readable medium having a computer program, which is executable by a processor, comprising:
a program code arrangement having program code for ascertaining a parking position for a vehicle, by performing the following:
ascertaining, via a processor system, a vehicle geometry and a maneuverability parameter of the vehicle; and
selecting, via the processor system, a parking position for the vehicle from a plurality of parking positions of a parking lot as a function of the vehicle geometry and the maneuverability parameter;
wherein the ascertaining includes at least one of: (i) detecting, via sensors, the vehicle geometry and the maneuverability parameter of the vehicle, and (ii) receiving the vehicle geometry and/or the maneuverability parameter via a communication network, and
wherein the vehicle is classified as a large vehicle or as a small vehicle as a function of at least one of: (i) the vehicle geometry, (ii) the maneuverability parameter and at least one variable and/or at least one maneuverability threshold value,
wherein the parking position is selected for the vehicle, which is situated directly adjoining a further parking position, wherein the parking position was already assigned to a further vehicle,
wherein one of the following is satisfied:
the further vehicle has been classified as a small vehicle as a function of at least one of: (i) a vehicle geometry of the further vehicle, (ii) a maneuverability parameter of the further vehicle, and at least one variable and/or at least one maneuverability threshold value, during a classification of the vehicle as a large vehicle, or
the further vehicle having been classified as a large vehicle during a classification of the vehicle as a small vehicle.

\* \* \* \* \*